United States Patent

Blanding

[11] Patent Number: 6,143,980
[45] Date of Patent: Nov. 7, 2000

[54] CABLE CLAMP

[76] Inventor: Douglas Blanding, 1016 Smithridge Rd., Bridgeport, N.Y. 13030

[21] Appl. No.: 09/133,415

[22] Filed: Aug. 13, 1998

Related U.S. Application Data

[63] Continuation-in-part of application No. 08/922,012, Sep. 2, 1997, Pat. No. 5,801,336.

[51] Int. Cl.⁷ ...................................................... H02G 7/05
[52] U.S. Cl. ..................................... 174/40 CC; 174/45 R
[58] Field of Search ............................ 174/40 R, 40 CC, 174/40 TD, 44, 45 R, 45 TD, 43, 144, 140 S, 145, 146, 147, 154, 155, 157, 160, 167, 168; 248/49

[56] References Cited

U.S. PATENT DOCUMENTS

| | | | |
|---|---|---|---|
| 2,831,915 | 4/1958 | Prowant | 174/154 |
| 2,974,184 | 3/1961 | Mather | 174/40 R |
| 3,113,994 | 12/1963 | Hammel et al. | 174/40 R |
| 3,244,803 | 4/1966 | Becker | 174/154 |
| 3,499,973 | 3/1970 | Barnes | 174/45 R |
| 3,643,009 | 2/1972 | Collister | 174/40 R |
| 3,884,442 | 5/1975 | Breeden et al. | 174/45 R |

Primary Examiner—Kristine Kincaid
Assistant Examiner—Adolfo Nino
Attorney, Agent, or Firm—George R. McGuire; Hancock & Estabrook, LLP

[57] ABSTRACT

An assembly for clamping and retaining a cable in attached relation to a utility pole. The assembly generally includes a block portion and clamping member pivotally and slidably connected thereto. The block member includes a rear end having a bored hole formed therein, a recessed portion formed in its upwardly facing surface, and a pair of spaced apart tongues vertically spaced from the recessed portion. The clamping member includes a body portion and a pair of spaced apart forks extending downwardly therefrom which are movable between engaged and disengaged relation to the recessed portion. A pivot pin passes through the body of the clamping member and the tongues of the block member. The hole formed through the clamping member's body is oval in shape so as to permit not only pivotal movement thereof with respect to the block member, but also sliding movement. The forks and tongues are shaped so as to receive and clamp a cable therebetween.

11 Claims, 4 Drawing Sheets

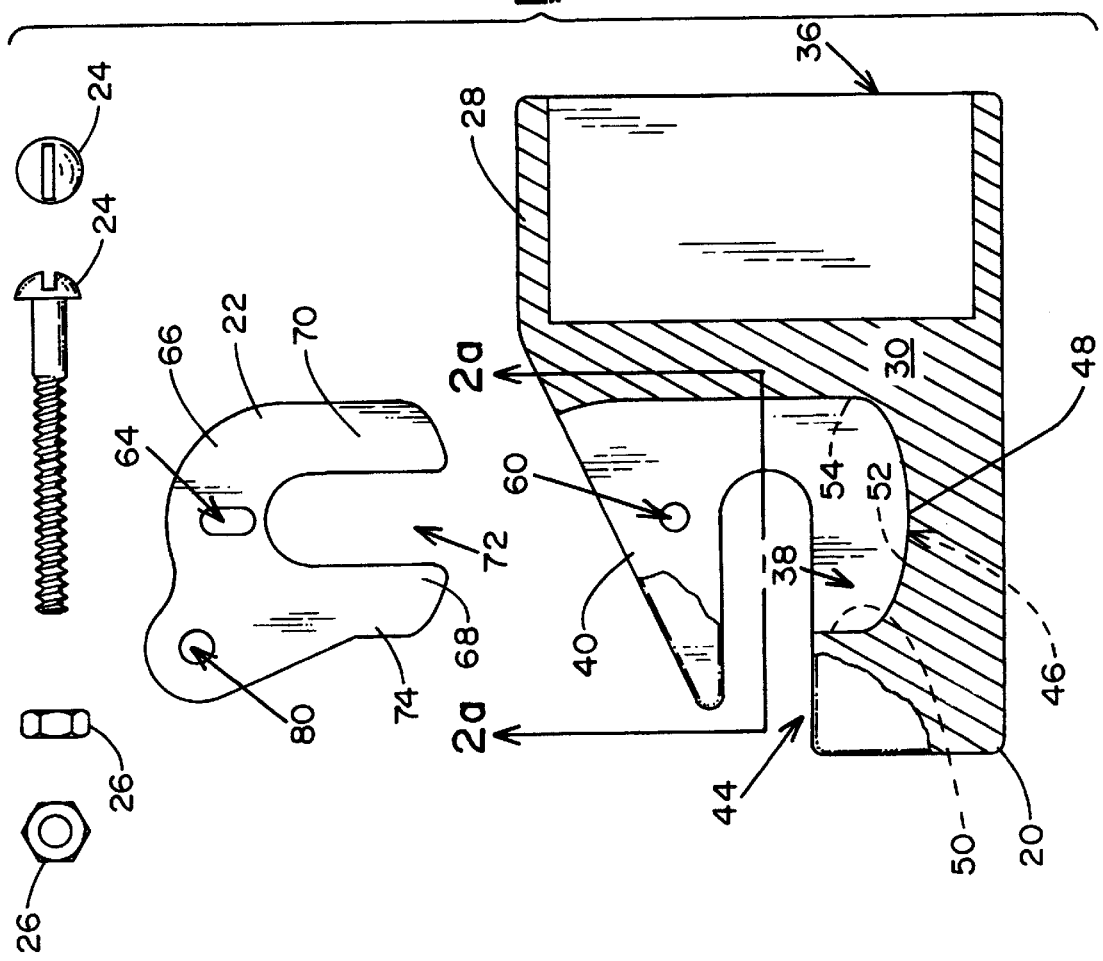

CABLE CLAMP

RELATED APPLICATIONS

The present application is a continuation in part of my application, Ser. No. 08/922,012 entitled Aerial Conductor Spacer and filed Sep. 2, 1997, now U.S. Pat. No. 5,801,336.

BACKGROUND OF THE INVENTION

The present invention generally relates to cable clamping assemblies, and more particularly to such assemblies used to clamp and retain power lines in connected relation to a utility pole.

Cables, such as electricity conducting cables, are generally attached to a utility pole, or a cross-arm attached to a utility pole, by wrapping or passing the cable around or through an insulator or "candlestick" mounted directly to the pole. While these articles effectively retain a cable to a pole, they are hard to work with and generally require a lineman to handle the "live" wire for long periods of time to effect the connection.

It is therefore a principal object and advantage of the present invention to provide a cable clamping assembly that is simple to use in connecting a cable to a utility pole.

It is another object and advantage of the present invention to provide a cable clamping assembly that eliminates the need for, or minimizes the time needed by a lineman to handle a "live" wire when connecting it to a utility pole.

Other objects and advantages of the present invention will in part be obvious, and in part appear hereinafter.

SUMMARY OF THE INVENTION

In accordance with the foregoing objects and advantages, the present invention generally comprises a cable clamping assembly that is easily mounted to a utility pole. The assembly includes a block portion and a cable clamping member that is pivotally and slidably attached thereto. The block portion includes a socket end adapted to be longitudinally inserted over the end of a conventional, utility pole cross-arm, and a recessed, clamp receiving portion having a pair of spaced apart tongues, each of which includes a hole formed therethrough which receive a pivot pin.

The clamping member includes two forks extending in spaced, parallel relation to one another which define a U-shaped slot adequately sized to receive a cable therein. An oval hole formed through the body of the clamping member receives a pivot pin therethrough to attach it to the block. The outwardly facing surface of the outer fork is shaped flat to conform to the flat shape of the corresponding portion of the block's recess.

The assembly may be inserted onto the end of a cross-arm, and a cable positioned between the forks of the clamping member which is disengaged from the block's recess. The clamping assembly may then be pivoted towards the recess and slid downwardly to sit in the recess, thereby locking the cable within the clamp assembly. The corresponding flats formed on the outer fork and lower wall of the recess cooperate to prohibit the clamping member from becoming disengaged from the recess without an external force sliding the clamping member upwardly out of the recess.

A second hole is formed through the body of the clamping member. By placing a stick or rod through the second hole and lifting outwardly away from the block, the clamping member will correspondingly slide out of and become disengaged from the body's recess.

BRIEF DESCRIPTION OF THE DRAWINGS

The present invention will be better understood when reading the following Detailed Description in conjunction with the accompanying figures, wherein:

FIG. 2 is an exploded front elevational view of a clamping assembly;

FIG. 2a is a plan view taken along line 2a—2a of FIG. 2;

FIG. 3 is an end view thereof; and

DETAILED DESCRIPTION

Figure 1:
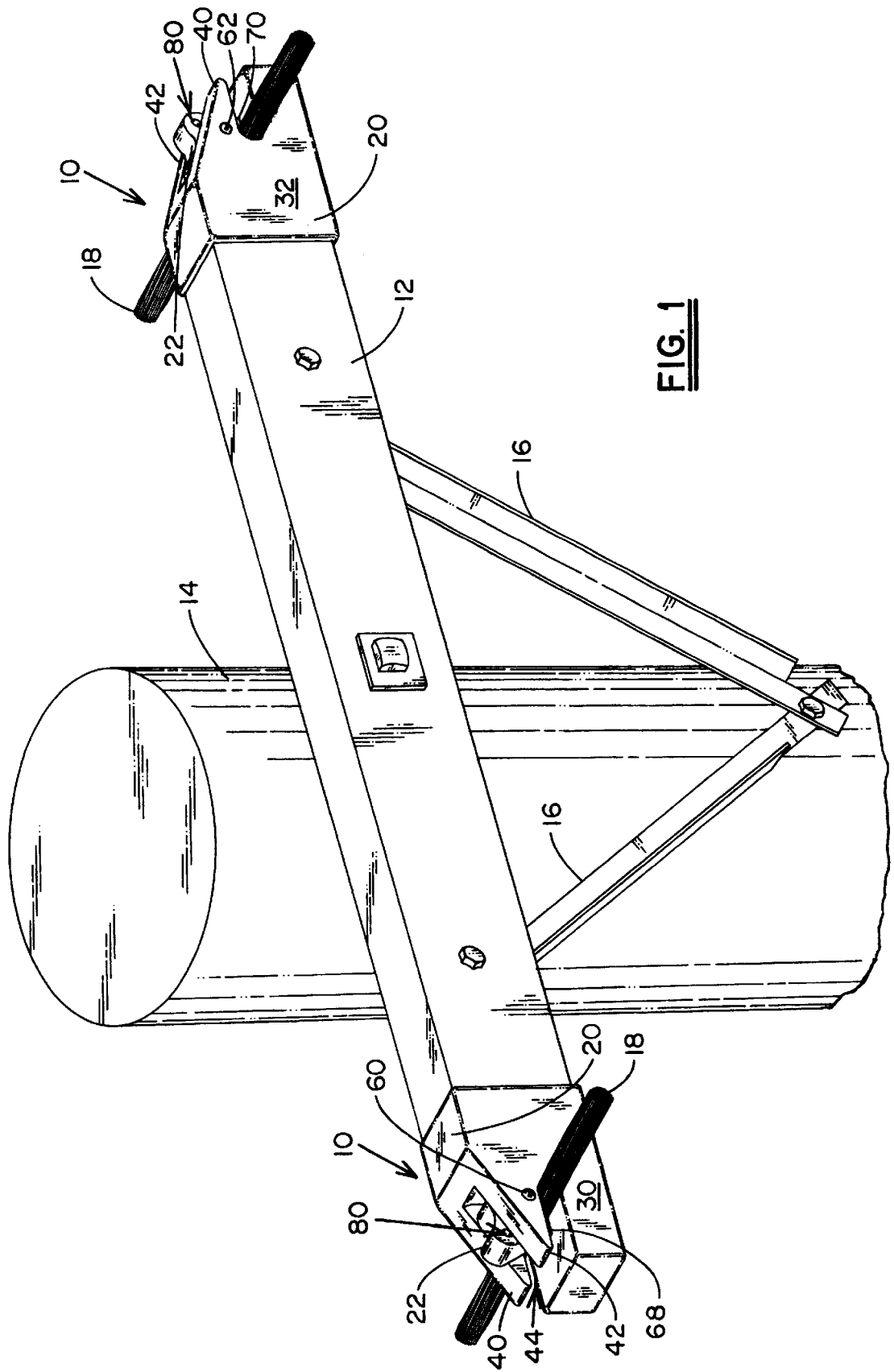
FIG. 1 is a perspective view of the present invention in its intended use.

Referring now to the drawings, wherein like reference numerals refer to like parts throughout, there is seen in FIG. 1 a pair of cable clamping assemblies, denoted generally by reference numeral 10, attached to the opposite ends of a cross-arm 12 extending transversely across and securely attached to the upper end of a utility pole 14, via mounting brackets 16. Clamping assemblies 10 are used to securely hold and retain electric cable 18 to cross arm 12 and maintain them in laterally spaced relation to one another and in vertically spaced relation to the ground.

With reference FIGS. 2 and 3 to clamping assembly 10 generally comprises a clamp block 20 to which a clamping member 22 is pivotally and slidably attached via a screw 24 and bolt 26 combination. Block 20 is partially comprises a body portion 28 having opposed, planar surfaces 30, 32, held in spaced relation to one another by an integral, contiguous end wall 34. A rectangularly shaped, bored hole 36 is formed through the end of 34 so as to securely, longitudinally receive the end of cross-arm 12 therein, thereby retaining assembly 10 thereon. Body portion 28 further includes a recessed portion 38, and fixed tongues 40, 42 integrally extending from body portion 28 in spaced, parallel relation to one another, and in vertically spaced relation to recess 38. A U-shaped slot 44 is defined in the space between tongues 40, 42 and recess 38.

Recess 38 is defined by a contiguous sidewall 46 and side edge 48. The area of sidewall 46 defining recess 38 includes a leading edge 50 which extends vertically downwardly before continuing along an arcuate bottom portion 52 and then terminating in an essentially vertically extending trailing edge 54. Tongues 40, 42 include a straight bottom edge 56, 58 and axially aligned holes 60, 62, respectively, formed therethrough.

Clamp 22 member is pivotally and slidably attached to block 20 in between tongues 40, 42. Clamp 22 member includes hole 64 that is oval shaped and formed through its body portion 66, and a screw 24, which acts as a pivot pin, which passes through holes 60, 64 and 62, thereby pivotally attaching clamp 22 to block 20. The oval shape of hole 64 permits clamp 22 to also be slid along screw 24.

Clamp 22 member further includes two forks 68, 70 extending integrally outwardly from its body portion 66. Forks 68, 70 extend in spaced, parallel relation to one another, forming a U-shaped channel 72 in which cable 18 will slidingly fit. Both forks 68, 70 may be simultaneously positioned in contoured relation to recessed portion 38, and fork 68 includes a flat, vertically extending portion 74 as its outwardly facing surface which contours and abuts leading edge 50 when positioned within recess 38.

Figure 4A:
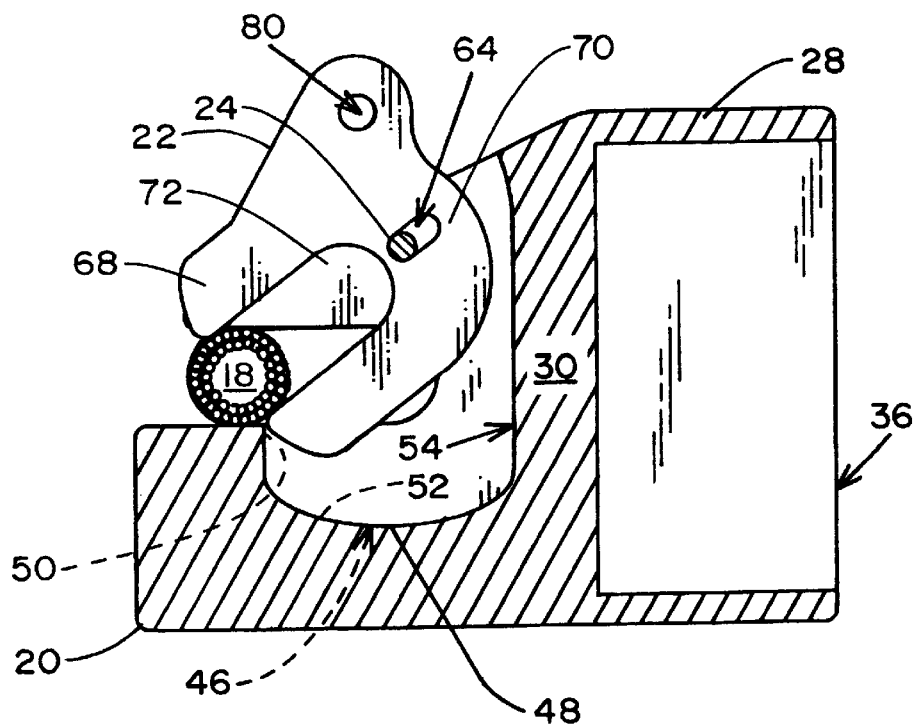
FIGS. 4a–4d are sequential, front elevational views illustrating the operation of the clamping assembly.

Referring now to FIGS. 4a–4d, the sequential operation of clamping assembly 10 is shown. FIG. 4a illustrates the initial step of locking cable 18 in assembly 10. Clamp member 22 is pivoted about screw 24 so as to open U-shaped channel 72 into which cable 18 may be slid. To ensure that channel 72 is large enough to receive cable 18, screw 24 should be positioned at the bottom of oval hole 64 in order to maximize the available space.

Figure 4B:
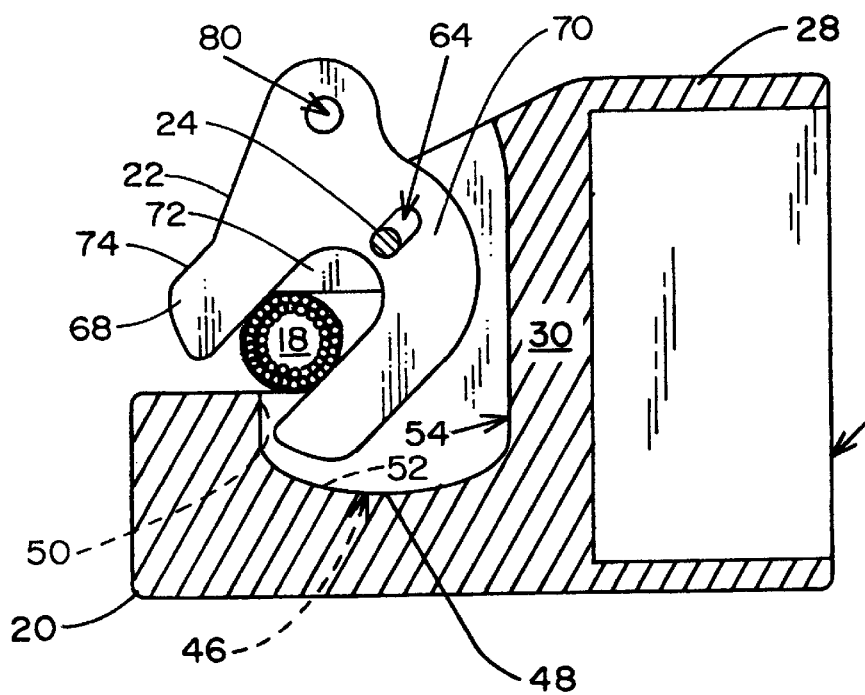

FIG. 4*b* reveals cable 18 being slid into engaging relation with channel 72, and into contact with forks 68, 70. At this point, screw 24 is still positioned at the bottom of hole 64.

Figure 4C:
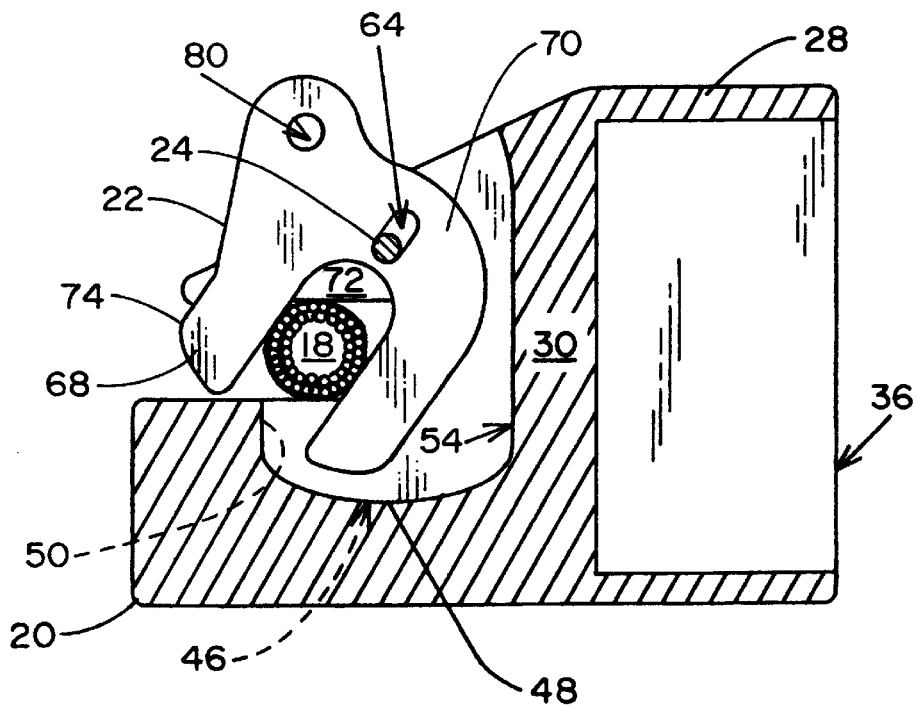

Once cable 18 comes into contact with forks 68, 70, it should continue to be slid inwardly, thereby causing clamp 22 member to pivot about screw 24 towards block 20 (counter-clockwise as shown), as seen in FIG. 4*c*. Screw 24 remains positioned at the bottom of hole 64 to permit enough clearance between fork 70 and block 20.

Figure 4D:
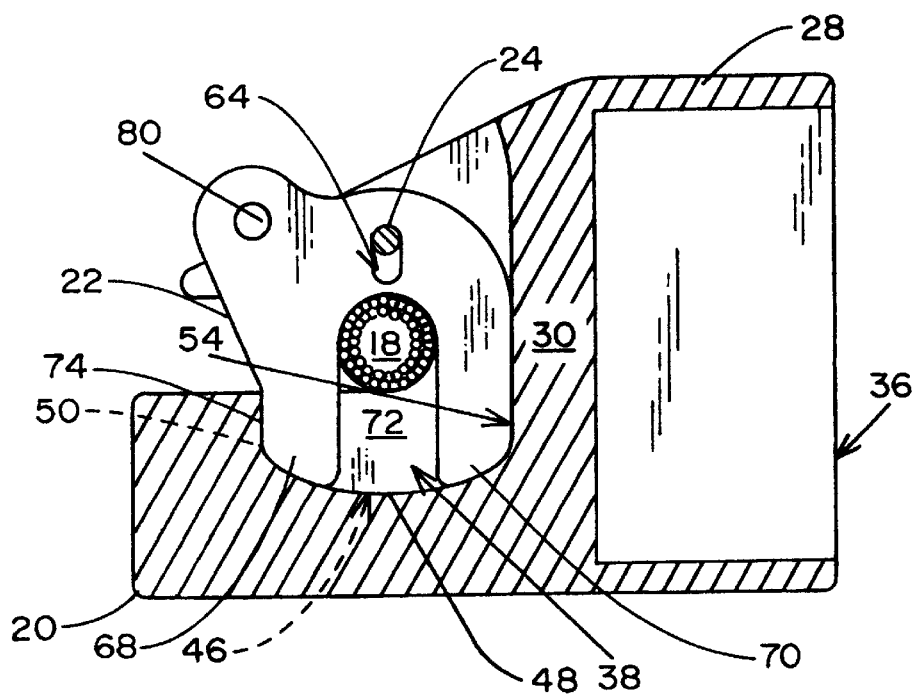

FIG. 4*d* illustrates completion of the cable clamping process. Cable 18 is positioned to its terminal position within slot 44, resulting in clamp 22 member pivoting about screw 24 until forks 68, 70 engage recessed portion 38 with fork 70 being positioned in contacting relation to trailing edge 54. In addition, clamp 22 member slides downwardly into recessed portion 38 as screw 24 repositions itself at the top of hole 64, thereby resulting in forks 68, 70 fully engaging recessed portion 38 with cable 18 being securely confined between forks 68, 70 and side edge 48. The vertically, extending portion 74 of fork 70 is positioned in contoured relation to the leading edge 50 of recessed portion 38, thereby locking clamp 22 to block 20, and consequently retaining cable 18 to clamp assembly 10.

To disengage forks 68, 70 from recess 38, clamp 22 member includes a hole 80 formed therethrough, adjacent the outwardly facing edge of the member. A user of assembly clamping 10 (such as a lineman) may insert an elongated rod (not shown) through hole 80 and pull upwardly, thereby causing screw 24 to slide downwardly within hole 64, and forks 68, 70 to become disengaged from recessed portion 38. clamp member 22 may then be pivoted about screw 24 (clockwise as shown) away from clamping block 20, thereby opening U-shaped channel 72 out of which cable 18 may be slid. This procedure eliminates, or at least minimizes, the amount of contact time a lineman needs to have with a live cable 18.

What is claimed is:

1. A cable clamping assembly, comprising:
  a) a block member having a first end with a bored hole of rectangular cross-section formed therein, and a recess; and
  b) a clamp member pivotally and slidably attached to said block member, and having first and second forks movable between engaged and disengaged relation with respect to said recess.

2. The cable clamping assembly of claim 1, wherein said bored hole is appropriately dimensioned to be slidingly and frictionally fit over the end of a utility pole cross-arm.

3. The cable clamping assembly of claim 1, wherein said first and second forks extend in spaced, parallel relation to one another.

4. The cable clamping assembly of claim 1, wherein said recess includes a contiguous wall defining the periphery thereof, said wall having essentially flat leading and trailing edges which extend in essentially parallel, spaced relation to one another.

5. The cable clamping assembly of claim 4, wherein said first and second forks each include an outwardly facing surface that is essentially flat and which contours said leading edge of said contiguous wall.

6. The cable clamping assembly of claim 1, wherein said block member includes at least one tongue portion positioned in aligned, spaced relation to said recess.

7. The cable clamping assembly of claim 6, wherein said at least one tongue portion and said clamp member include first and second holes formed therethrough, respectively, said first and second holes being axially aligned with one another.

8. The cable clamping assembly of claim 7, wherein said second hole is oval.

9. The cable clamping assembly of claim 8, and further comprising a pivot pin positioned through said first and second holes, thereby pivotally and slidably connecting said clamping member to said block member.

10. A method of clamping a cable within a clamping assembly having a block portion including a recess formed therein and at least one tongue aligned with and spaced from said recess, and a clamp pivotally and slidably attached to said block member, and including first and second forks movable between engaged and disengaged relation with respect to said recess, said method comprising the steps of:
  a) positioning said first and second forks in disengaged relation to said recess;
  b) sliding said cable into contacting relation with said first and second forks;
  c) pivoting said first and second forks towards said recess with said cable being positioned between said first and second forks and said at least one tongue; and
  d) sliding said first and second forks into engaging relation with said recess, thereby clamping said cable between said first and second forks.

11. The method of claim 10, and further comprising said clamping member having a hole formed therethrough, and the method for removing said cable from said clamping assembly including the steps of:
  a) inserting an elongated rod through said hole;
  b) lifting said rod outwardly away from said recessed portion, whereby said first and second forks will disengage from said recessed portion; and
  c) pivoting said first and second forks away from said recessed portion and pulling said cable away from said clamping assembly.

* * * * *